2,947,790
PROCESS FOR PRODUCTION OF CHLORINATED PHENOLS WITH RECOVERY OF HYDROCHLORIC ACID

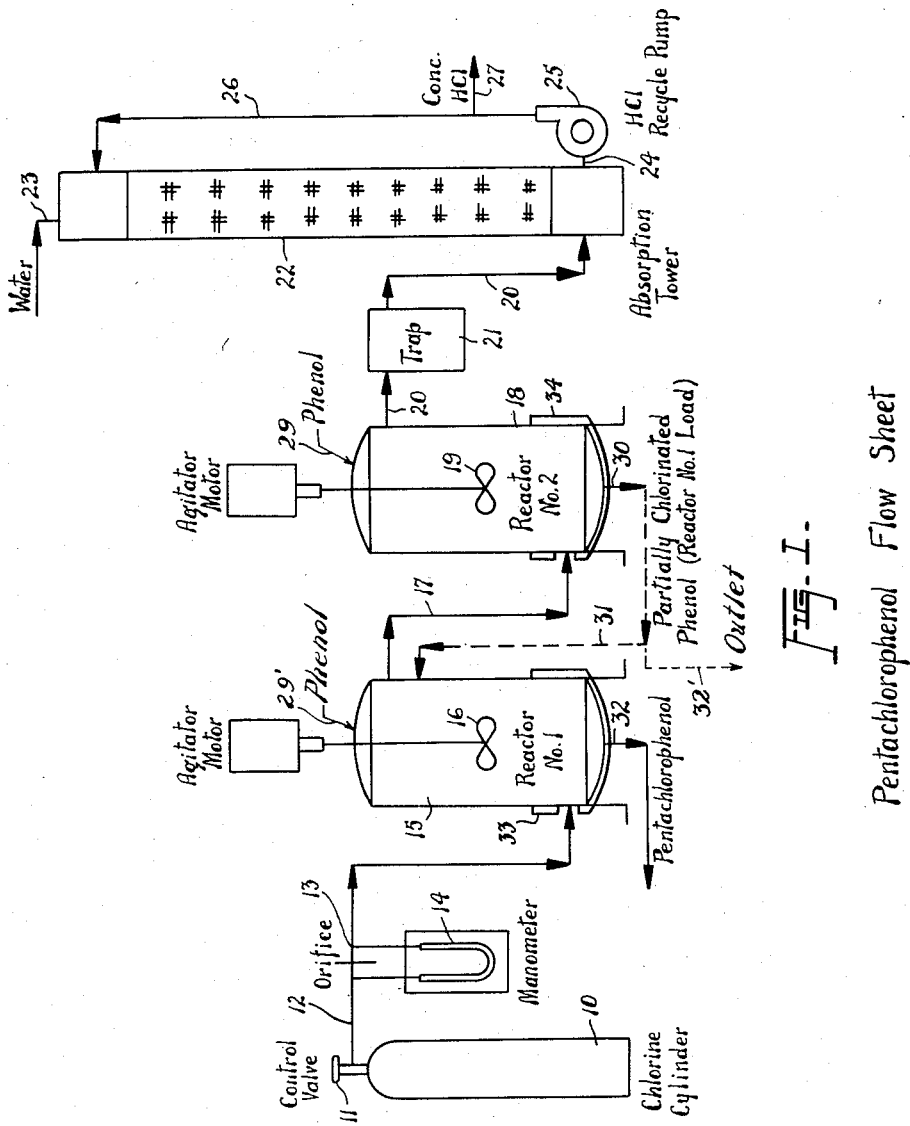

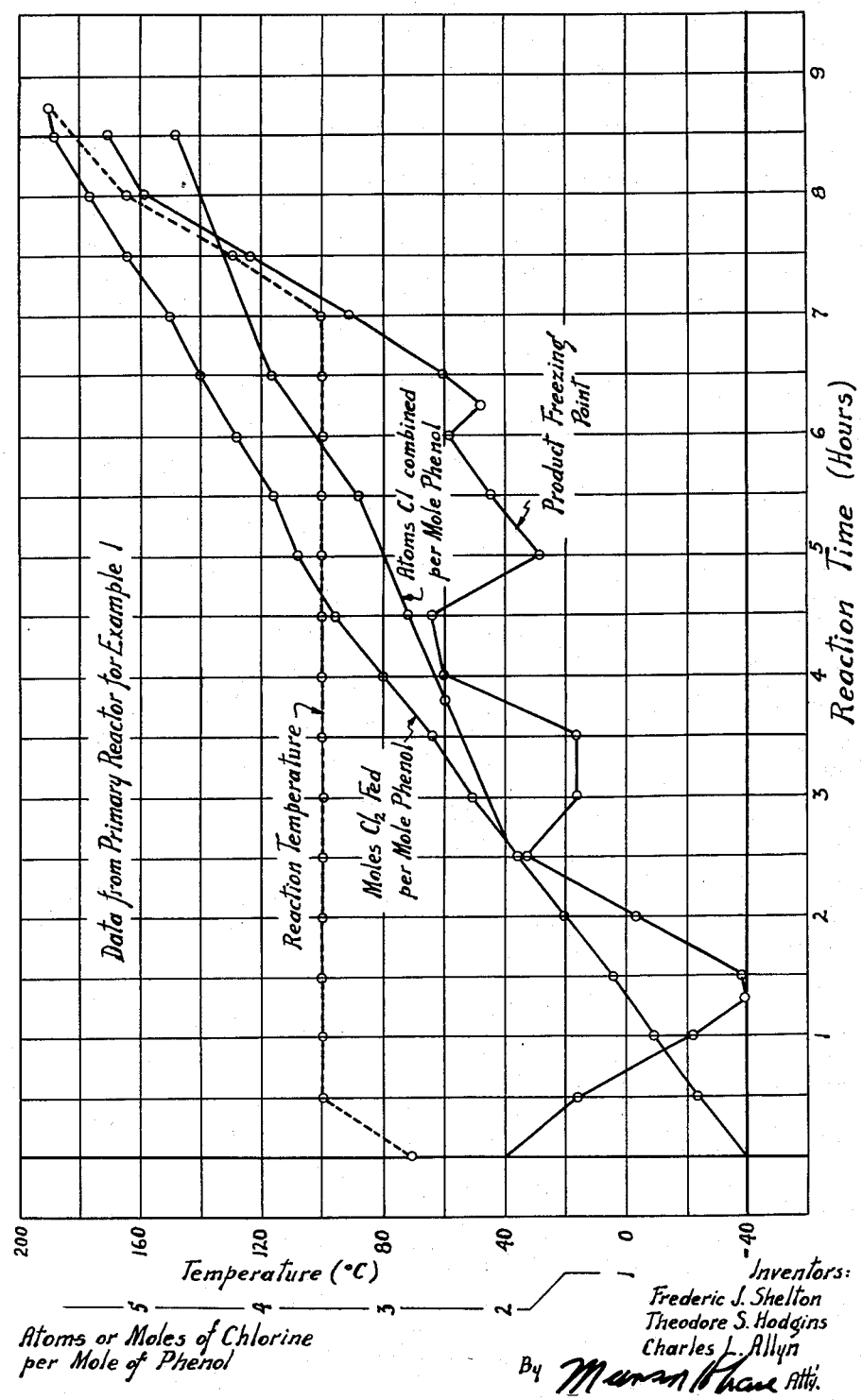

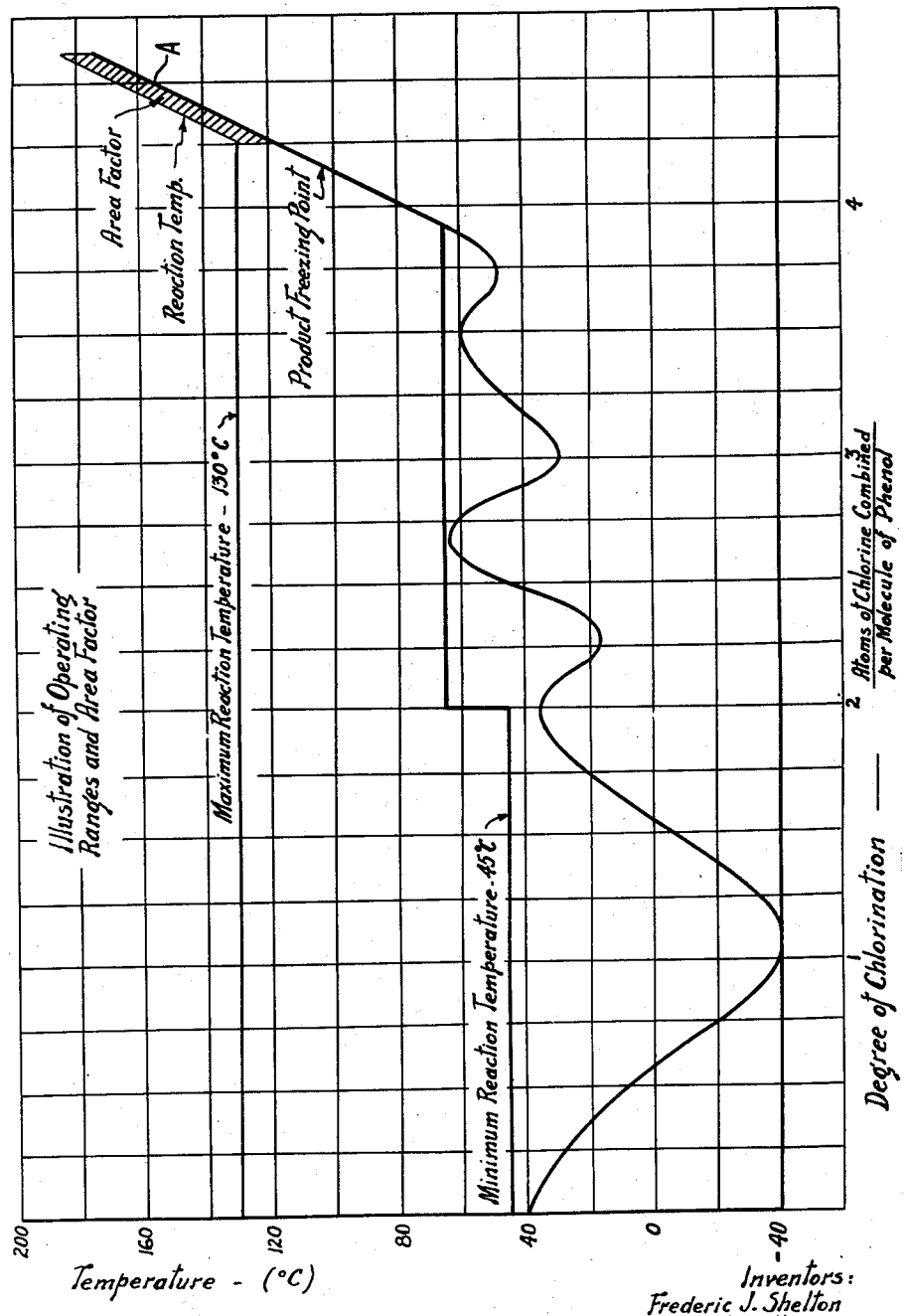

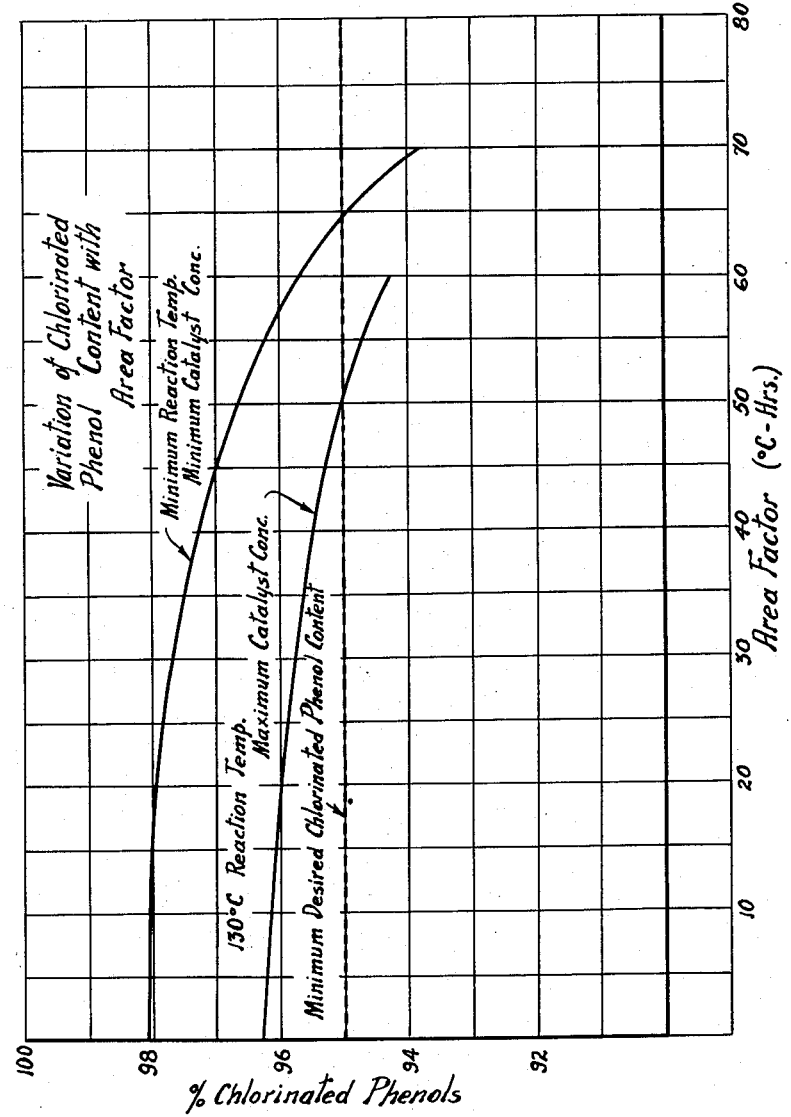

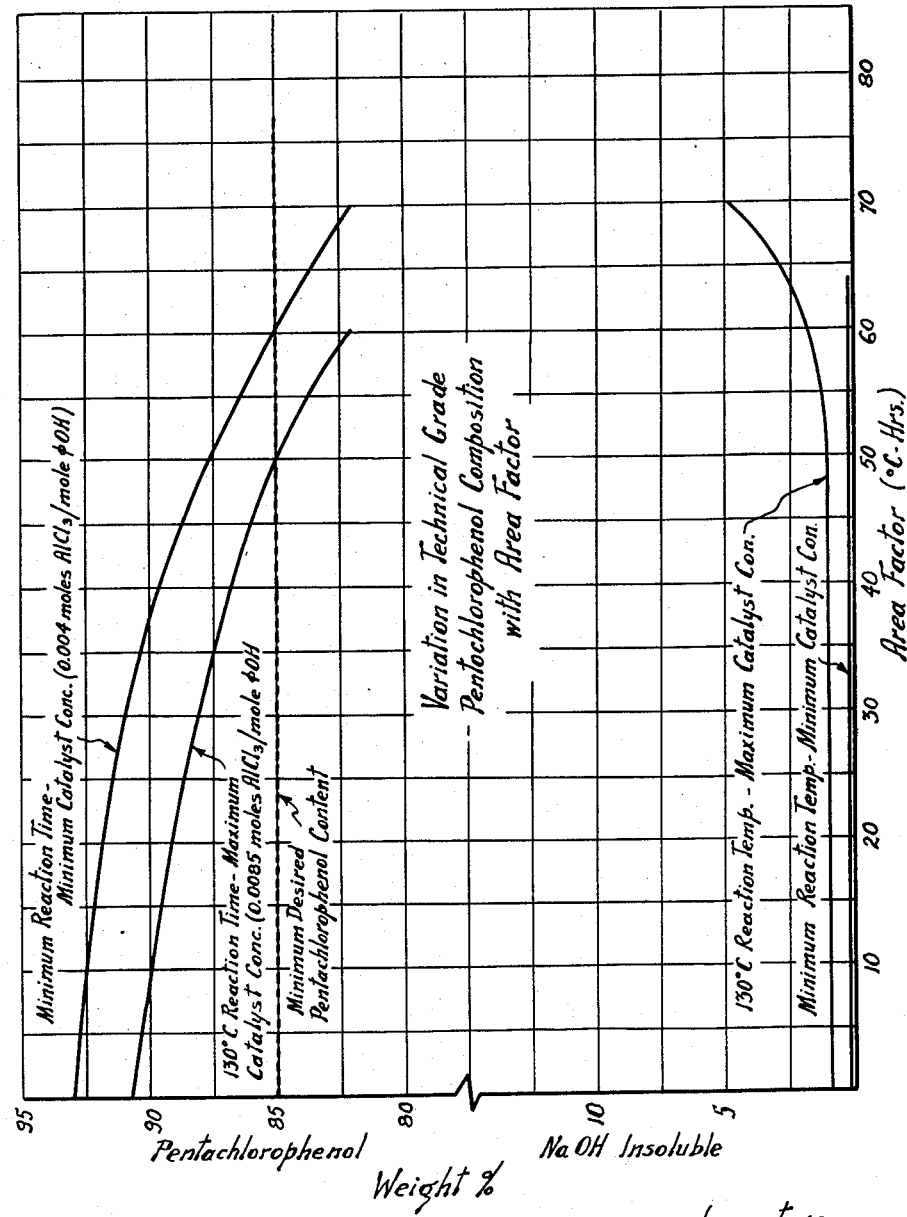

Frederic J. Shelton, Seattle, Wash., Theodore S. Hodgins, White Plains, N.Y., and Charles L. Allyn, Seattle, Wash., assignors to Reichhold Chemicals, Inc., Detroit, Mich.

Filed Jan. 14, 1958, Ser. No. 708,839

4 Claims. (Cl. 260—623)

This invention relates to an improvement in process for production of various chlorinated phenols starting with phenol and chlorine as the raw materials and carrying out the reaction under controlled conditions at substantially atmospheric pressure so that it is possible to produce two chlorinated phenols of differing degrees of chlorination and substantially pure hydrochloric acid simultaneously with the complete use of the chlorine supplied.

This application is a continuation-in-part of our application Serial No. 473,217, filed December 6, 1954, now abandoned in favor of the present application.

An important object of the present invention is to carry out the chlorination under carefully controlled conditions so as to produce technical grade pentachlorophenol which will consistently meet the requirements of Federal Specification TT–W–570.

Another object of this invention is to carry out the chlorination under carefully controlled condition so as to produce technical grade pentachlorophenol which will consistently contain a maximum pentachlorophenol content.

The present process is adapted for the production of various chlorinated phenols such as pentachlorophenol; 2,4,6-trichlorophenol; and 2,4-dichlorophenol, together with hydrochloric acid. The reaction conditions, i.e. the chlorine feed rate, temperature and ratio of phenol in the primary reactor and secondary reactor or scrubber, may be varied to provide commercial yields of tri, tetra, or pentachlorophenol in the primary reactor and monochlor or dichlor or trichlorophenol in the scrubber reactor together with stoichiometric amounts of hydrochloric acid which is recovered substantially free of chlorine and phenolic bodies.

A further object of this invention is to provide a process for the production of 2,4-dichlorophenol for the subsequent manufacture of 2,4-dichlorophenoxyacetic acid with utilization of the by-product chlorophenols for the production of pentachlorophenol. In the chlorination of phenol to 2,4-dichlorophenol some monochloro and trichlorophenol is obtained. The 2,4-dichlorophenol is removed from the mixture by distillation or other means, leaving the monochloro and trichlorophenols as by-products. These materials can be combined and used in our process as the load for the primary reactor 15 for further chlorination to pentachlorophenol. Simultaneously, phenol in the scrubber reactor can be chlorinated to produce additional 2,4-dichlorophenol.

The art of chlorinating phenol is well known as exemplified by U.S. Patent No. 2,131,259, and the use of relatively small quantities of aluminum chloride as a catalyst (0.01–0.04 mole of aluminum chloride per mole of phenol) for introducing chlorine into the phenol molecule is an accepted commercial practice. Our invention is an improvement upon the practice disclosed in Patent No. 2,131,259.

Another object of our invention is the production of a chlorinated phenol mixture having at least 95% chlorinated phenol, less than 1% insoluble matter in sodium hydroxide solution, and a minimum freezing point of 174.0° C. directly and without requiring any further purification or refining after the chlorination step. In order to do this we have found that the catalyst concentration is critical and it is permissible to use not more than 0.0085 mole of anhydrous aluminum chloride per mole of phenol, which is only a fraction of the amount used in Patent No. 2,131,259. We prefer to use 0.0075 mole and not less than 0.004 mole of anhydrous aluminum chloride per mole of phenol. If less than 0.004 mole of aluminum chloride per mole of phenol are used the rate of chlorination beyond the point where two atoms of chlorine are combined per mole of phenol is too slow to be of economic importance. The initial chlorination up to where two atoms of chlorine are combined per mole of phenol may be carried out in the absence of catalyst. While, however, catalyst may be present in the initial stages, we ordinarily prefer to add aluminum chloride catalyst after this stage has been reached in order to achieve the best color, a chlorinated phenol content over 95%, and a maximum freezing point in the final product.

In our process we conduct the chlorine through a conventional flow measuring device and then into phenol in a primary reactor which may be constructed of glass lined steel or other acid resisting material. The temperature of the phenol in the primary reactor at the start of the chlorination is in the range of 65° C. to 130° C. and preferably 105° C. and is held at this temperature until the melting point of the product is 95° C. and about 3 to 4 atoms of chlorine are combined as determined by analysis, at which time the temperature is progressively increased to maintain a preferred differential temperature of 10° C. over the product melting point. A period of about five to fifteen hours is required for the chlorination. During this time the off-gas from the reactor, which is made up largely of pure HCl during the initial reaction and largely chlorine at the conclusion of the reaction, is conducted to a scrubber system which may be a kettle or a packed tower containing phenol in sufficient excess and is held at a temperature sufficiently high above the melting point so that substantially complete reaction occurs between the chlorine and the excess phenol to give one or more of the lower chlorinated homologs and substantially pure HCl gas. The lower chlorinated phenols formed in the scrubber reactor may be separated, purified and sold, or may be used as the primary reactor load for a subsequent batch to be chlorinated to pentachlorophenol. If the lower chlorinated phenols from the scrubber reactor are used as a load in the primary reactor for a subsequent batch of pentachlorophenol no separation or purification step is required.

The HCl gas from the scrubber reactor is recovered by dissolving in water in a suitable absorption tower. By this process we are able to produce substantially pure hydrochloric acid in any of the usual strengths directly suitable for commercial use. This constitutes an economic advantage since the hydrochloric acid produced in our process is essentially free of objectionable chlorine and does not require any expensive reworking to produce a commercial product such as is the case where the off-gas contains free chlorine. In prior processes where the off-gas contains free chlorine the off-gas has usually not been recovered for the acid value but has been vented or absorbed by alkali, or used in a process for iron chloride production from scrap iron.

In pentachlorophenol production, if the process of Patent No. 2,131,259 is used, it is necessary to use a considerable excess of chlorine in a batch process to produce pentachlorophenol in any reasonable length of time. This excess of required chlorine thereby increases the overall cost of manufacture of the pentachlorophenol by increasing the cost of chlorine in the raw materials and in the extra HCl purification system costs.

We have found that under the conditions of our process the absorption of chlorine is practically quantitative until 2 atoms of chlorine are combined with 1 mole of phenol. From this point on the rate of absorption of chlorine falls off along a characteristic isotherm. It is the relatively fast, practically quantitative, absorption of chlorine up to the dichloro stage that is utilized in our process to provide the high rate of production of pentachlorophenol, the quantitative utilization of chlorine, and to produce high purity hydrochloric acid.

Advantage is taken of these factors in our two-stage chlorination process whereby phenol or chlorophenol or a combination of chlorophenols are chlorinated to pentachlorophenol in stage one. The chlorine containing off-gas from this stage is used to chlorinate phenol to at the most trichlorophenol and thereby produce a substantially chlorine-free hydrochloric acid.

The invention will be more readily understood by reference to the accompanying drawings and the following specific examples in which the invention is set forth by way of illustration rather than by way of limitation.

Referring to the drawings:

Fig. 1 is a flow sheet comprising a diagrammatic showing of a suitable apparatus for carrying out the invention.

Fig. 2 comprises a series of graphs based on the disclosure of specific Example I appearing hereinafter.

Fig. 3 illustrates useful operating ranges for our process.

Fig. 4 shows the variations of chlorinated phenol content of the product with area factor.

Fig. 5 illustrates the change in composition with area factor.

Referring particularly to Fig. 1, reference numeral 10 denotes a chlorine cylinder with a control valve 11, an outlet pipe 12 leading through a conventional flow measuring device 13, equipped with a manometer 14, to the lower portion of a primary reactor 15 equipped with a motor driven agitator 16, and having an outlet pipe 17 leading to the lower portion of a secondary reactor or scrubber 18, which may be referred to as a scrubber reactor. From the upper end of the scrubber-reactor 18 a pipe 20 leads through a trap 21 to the lower portion of a suitable absorption tower 22. Water may be introduced into the top of the tower 22 through a pipe 23, and concentrated hydrochloric acid may be taken off from the lower portion of the scrubber at 24 and a portion thereof recirculated by means of a pump 25 and pipe 26 leading to the top of the tower, and another portion may be withdrawn from the system through the pipe 27.

Phenol for the reaction may be supplied to the top of the scrubber reactor 18 through pipe 29, and to the top of the primary reactor 15 through pipe 29'. From the bottom of the scrubber reactor 18 partially chlorinated phenol may be withdrawn through pipe 30, and a portion or all of the withdrawn product may be passed into the upper part of the primary reactor 15 through pipe 31. An outlet pipe 32 is shown leading from the bottom of the primary reactor 15 for finished pentachlorophenol. If desired, partially chlorinated phenols may be withdrawn from the system through an outlet 32' leading from the pipes 30, 31 connecting the primary and secondary reactors. Heating and cooling means are provided for reactors 15 and 18 by external jackets 33 and 34 respectively.

Example I

The following is an example of the simultaneous preparation of pentachlorophenol ad monochlorophenol:

In the equipment as shown in Fig. 1, 659 grams of phenol were charged to the primary reactor 15 and 330 grams of phenol were charged to scrubber reactor 18. The temperature of both reactors was raised to 70° C. and the air in the reactors was swept out with nitrogen. The temperature in the scrubber reactor 18 was maintained at 70° C. throughout the chlorination. The temperature in the primary reactor 15 was slowly increased from 70° C. to 190° C. as is graphically indicated in Fig. 2. Also represented in Fig. 2 are the total moles of chlorine fed per mole of phenol; the total atoms of combined chlorine per mole of phenol for the product in the primary reactor; and the primary reactor product freezing point versus the reaction time. It should be noted that there are four minimums and four maximums in the freezing point curve other than the initial freezing point of phenol. This behavior reflects the presence of eutectic mixtures of the various chlorinated products. The pentachlorophenol which we desire, must contain at least 95% chlorinated phenols; have less than 1% caustic insoluble materials; have a freezing point not less than 174.0° C. as determined by the test methods of Federal Specification TT-W-570.

To achieve the product we desire the chlorination of the material in the primary reactor 15 must be stopped when the melting point of the product has reached about 174° C. Further chlorination beyond 174° C. results first in an increase in product melting point to about 177° C. then in a decrease in the melting point (or freezing point), a decrease in content of chlorinated phenols, and a rapid increase in material insoluble in sodium hydroxide.

In this example 7 grams of anhydrous aluminum chloride (C.P. Baker's) were added to primary reactor 15 when the product in such reactor first reached a freezing point of 50° C. No catalyst was used during the chlorination in the scrubber reactor 18. The product from reactor 15 contained 98.0% chlorinated phenols, 0.7% material insoluble in sodium hydroxide, and had a freezing point of 174.0° C. The color was grayish-black and showed the presence of many large white needle form crystals of pentachlorophenol. A yield of 1,685 grams of product was obtained from reactor 15. This product had a combined chlorine content of 64.5% as determined by the Parr bomb method; and 445 grams of product were obtained from scrubber reactor 18.

The product from the scrubber reactor 18 was a dark colored liquid having combined chlorine content of 28%, corresponding to monochlorophenol and a freezing point of 5° C. and a boiling point range of 170 to 215° C. The gases exhausting from reactor 18 were passed through a liquid separator and then absorbed in a counter-current water absorption system to make 36% hydrochloric acid solution.

Example II

In the equipment as shown in Fig. 1, a chlorination of partially chlorinated phenol containing 2.68 atoms of chlorine per mole of phenol to pentachlorophenol took place in the primary reactor 15 and a product was obtained which contained 2.68 atoms of chlorine per mole of phenol in the scrubber reactor 18 and pure hydrochloric acid was produced in the off-gas absorber 22. 7 gram moles of phenol were placed in the scrubber reactor 18 and 7 gram moles of product from a previous run containing 2.68 atoms of chlorine and 0.005 mole of aluminum chloride per mole of phenol were placed in the reactor 15. Both primary reactor 15 and scrubber reactor 18 were 2 liter Pyrex flasks equipped with glass stirrers. The starting temperature in the primary reactor 15 was 130° C. and in the scrubber reactor 18 it was 60° C. Chlorine feed rate for the first hour was 1.65 moles of chlorine per mole of phenol per hour and for the next four hours the feed rate was 0.71 mole chlorine per mole of phenol per hour and for the next half hour the feed rate was approximately 0.3 mole of chlorine per mole of phenol. The temperature in the primary reactor 15 was held at 130° C. for three and three quarters hours and then raised to 180° C. during two and one-half hours and held at 180° for one-half hour until the melting point of the product was 174° C. and substantially 4.68 atoms of chlorine were combined per mole of phenol (as determined by the Parr bomb method. Subsequent analysis by the methods of analysis given in Federal Specification TT-W-570 indicated that the chlorinated phenols were 95.2%; the insoluble matter was 0.9%; and the freezing point was 176° C. This product fully met the requirements of this specification which applies to wood preservative pentachlorophenol. The off-gas from the scrubber reactor 18 was run through the absorption tower 22 to produce 2500 grams of 36% hydrochloric acid and analysis showed the product to contain less than 0.2% free chlorine and substantially no phenolic bodies. During the same time the temperature in the scrubber 18 which started at 60° C. was increased to 120° C. during the first half hour and then was held at 120° C. for the remaining five hours. At the conclusion of the run the melting point of the product in the scrubber reactor 18 was 24° C. and analysis showed it to contain 2.68 atoms of chlorine per mole of phenol.

Examples I and II illustrate chlorination conditions which produce a technical grade pentachlorophenol meeting the requirements of Federal Specification TT-W-570. The product defined by this specification, however, can be further defined in terms of its actual chemical composition. We have analyzed the chlorinated phenol fraction of technical grade pentachlorophenol and have found it to consist of tetrachlorophenol, pentachlorophenol, hexachlorophenol and chlorine containing polymeric compounds soluble in certain concentrations of dilute sodium hydroxide solution. We have not been able to establish the presence of trichlorophenol. Hexachlorophenol is present in quantities of less than 0.1%. Technical grade pentachlorophenol, according to our analysis, consists of about 83% pentachlorophenol, 3-7% tetrachlorophenol, 3-7% polymers, and less than 0.1% hexachlorophenol.

Our analysis agrees closely with the specifications for technical grade pentachlorophenol which have been accepted commercially for the past several years. The standard label analysis for technical grade pentachlorophenol is as follows:

| | Percent |
|---|---|
| Pentachlorophenol | 83 |
| Other chlorophenols and related compounds | 12 |
| Inert ingredients | 5 |

Commercial products sold on the basis of meeting the above listed composition are Dowicide 7, manufactured by Dow Chemical Company, Midland, Michigan, Santophen 20, manufactured by Monsanto Chemical Company, St. Louis, Missouri, and 660 Chlorophen, manufactured by Reichhold Chemical Company at Tacoma, Washington.

Since most technical grade pentachlorophenol is sold for wood preservation applications, and pentachlorophenol is the desired active ingredient, a means for the manufacture of a product having a high pentachlorophenol assay directly from phenol without intermediate purification steps or a purification of the final product has been the subject of much research. U.S. Patent No. 2,131,259 illustrates two methods by which high yields of pentachlorophenol can be obtained. One method is to chlorinate a pure chlorophenol containing three or more chlorine atoms such as trichlorophenol or tetrachlorophenol at or above the melting point of the product in the presence of from 0.01 to 0.04 mole of aluminum chloride per mole of the phenol as a catalyst. According to Examples 4 and 5 of said patent high yields of pentachlorophenol were obtained without accompanying unsatisfactory quantities of alkali insoluble products by this method. Application of the method to phenol as the starting material, however, as is shown in Example 1 produced a product over 98% of which was soluble in aqueous alkali. For a satisfactory commercial product over 99% of the product must be soluble in aqueous alkali.

The second procedure illustrated is to chlorinate phenol or a chlorophenol, in the presence of from 0.01 to 0.04 mole of aluminum chloride per mole of the phenol as a catalyst, with the aid of a solvent such as ethylene chloride. Through the use of a solvent the temperature of the reaction mass can be held considerably below the melting point of the product. Side reactions are thereby suppressed and the yield of pentachlorophenol is enhanced. Smaller quantities of dilute alkali insoluble products are produced and the quantity of alkali insoluble material is further reduced by the extraction of the product from the solvent. This step in many cases amounts to a product purification. Solvent recovery is an expensive disadvantage of this procedure. Also, the low reaction temperature reduces the rate of reaction and increases the chlorination time.

We have discovered that phenol can be chlorinated directly without the use of solvents, intermediate purification steps or product purification steps, to produce a product exceeding the requirements of Federal Specification TT-W-570 as regards chlorinated phenol content, freezing point and alkali insoluble matter. Further, through the use of our process we obtain a product of very high pentachlorophenol content. We produce a technical grade pentachlorophenol containing from 85 to 92.6 pure pentachlorophenol as contrasted to the present commercial product containing 83%. Our process comprises the chlorination of phenol at or above the melting point of the product in the presence of a critical range of catalyst concentration and novel control of the time-temperature relationship during the chlorination.

Pentachlorophenol, like most organic compounds, is subject to degradation when exposed to high temperatures. The degradation products are, in general, dilute alkali insoluble. The degradation reactions are accelerated by the presence of trace quantities of metallic chloride impurities in the pentachlorophenol, including apparently aluminum chloride. Iron, tin and antimony chlorides have been found to promote rapid degradation of pentachlorophenol at its melting point. We have found, however, that aluminum chloride when used in the concentration of from about 0.004 to 0.0085 mole of aluminum chloride per mole of the phenol selectively promotes the chlorination of the lower chlorophenols to pentachlorophenol at the melting temperature of pentachlorophenol. The rate of the degradation reactions is slow enough with this concentration of aluminum chloride and at this temperature to allow the production of a superior technical grade pentachlorophenol product.

The minimum usable catalyst concentration we have found to be 0.004 mole of active aluminum chloride per mole of phenol. We have found that the addition of 0.004 mole of anhydrous aluminum chloride per mole of commercial phenol does not give 0.004 mole of active aluminum chloride per mole of phenol. This problem arises from the fact that commercial phenol always contains traces of water. The Baker's Analyzed Reagent Crystal Phenol which we used in many of our experiments contained approximately 0.30% water. Commercial synthetic phenol supplied by Reichhold Chemicals, Inc. and others which was used in laboratory and pilot plant experiments contained from 0.02 to 0.10% water. We have found that it is necessary to correct for this water by assuming that aluminum chloride and water react mole for mole to form an inactive oxychloride.

Pentachlorophenol, fortunately is more resistant to degradation by high temperatures when traces of metallic chlorides are present than its precursors phenol, monochloro, dichloro, trichloro and tetrachloro phenol, in this order, which are formed during pentachlorophenol manufacture. Our data indicates that the substitution of chlorine on the aromatic ring increases the stability of the molecule. This explains why Stoesser in U.S. Patent No. 2,131,259 was able to chlorinate trichlorophenol to pentachlorophenol with a satisfactory alkali insoluble content, but he was not able to chlorinate phenol to pentachlorophenol with the resulting product more than 99% soluble in aqueous alkali.

To chlorinate phenol, without the aid of a solvent, to a product of maximum pentachlorophenol content, catalyst concentration, reaction temperature and time are important. A high temperature for any given time is much more destructive than a low temperature for the same period of time. At the same temperature level and for the same time the lower chlorophenols are more susceptible to degradation than are tetrachlorophenol and pentachlorophenol, however, the lower operating temperatures, when these compounds are prevalent, reduces insoluble formation.

To chlorinate phenol without the aid of a solvent in a liquid system, the minimum temperature which could be used is the melting temperature of the product as the chlorination proceeds. To utilize this minimum temperature the reaction temperature would have to be varied according to the melting temperature of the product. Until about two atoms of chlorine have combined with phenol the reaction proceeds, with or without catalyst, very rapidly and substantially quantitative utilization of the chlorine is obtained at the melting temperature of phenol. The minimum temperature which we prefer to use for either reactor is 45° C. We have found, however, that the rate of reaction is impractically slow at temperatures below 65° C. after two atoms of chlorine have combined with phenol.

The maximum usable temperature for the scrubber reactor 18 is 130° C. and for the primary reactor 15, 130° C. until the freezing point of the product reaches 130°, to obtain a product containing 85% pentachlorophenol. These operating conditions are illustrated in Fig. 3.

Control of the reaction temperature is critical after the product freezing temperature has reached the steady reaction temperature used in the primary reactor 15. The highest temperatures to which the product is exposed are encountered during this last stage of the chlorination. The minimum temperature which can be used is the freezing temperature of the product at the time under consideration. Attempting to hold the reaction temperature at the freezing temperature of the product involves considerable risk as portions of the mass may solidify with resulting damage to the reactor and agitator. Practically, a reaction temperature higher than the freezing temperature of the product must be used. Time and temperature are here again inter-related.

In order to define the unique usable operating range we desired to claim we have utilized the measurement of the area A which lies between the reaction temperature curve and freezing temperature curve for the product for its last rise in the final stage of the chlorination. We measure the area between the freezing temperature curve and the reaction temperature curve from the time the product freezing temperature reaches 120° C. to the completion of the chlorination. This area is illustrated in Figure 3. For all practical purposes the effect of the area generated below 120° C. is negligible. With a plot as shown in Figure 3, having the ordinate in degrees centigrade and the abscissa in hours, the area has dimensions of degrees centigrade-hours. We have found that we can allow the area between the curves as defined and hereinafter called the area factor to reach 50 degree hours and still maintain the pentachlorophenol assay of our product at 85% when the maximum catalyst concentration—0.0085 mole of aluminum chloride per mole of phenol—and a reaction temperature of 130° C. are used. This is illustrated in Example IX. With this area factor and catalyst concentration the alkali insoluble content of the product is about 1%—the maximum allowable. With the minimum catalyst concentration— 0.004 mole of aluminum chloride per mole of phenol— and minimum reaction temperature an area factor of 60 degree-hours may be used and still maintain the product assay at 85% pentachlorophenol. This is illustrated in Example VIII.

In carrying out our invention we are primarily concerned with the production of technical grade pentachlorophenol having a minimum of 95% chlorinated phenols and 85% pentachlorophenol content and simultaneously maintaining the alkali insoluble content below 1%. To do this we have found that the chlorination reaction taking place during the production of tetrachlorophenol and pentachlorophenol is extremely critical because of the high temperatures involved, as distinguished from the chlorination from phenol to monochlorophenol to dichlorophenol to trichlorophenol to tetrachlorophenol where low temperatures are involved. Technically we control this reaction very carefully once the freezing point of the chlorinated product reaches 120° C. which is between the freezing point of tetrachlorophenol and pentachlorophenol. We find that the operating conditions must be adjusted as above described to produce a satisfactory product.

*Example III*

The following is an example of a phenol chlorination in the absence of catalyst.

In the equipment as shown in Figure 1, 600 grams of synthetic phenol were charged to the primary reactor 15. Scrubber reactor 18 was left empty. The temperature in reactor 15 was increased to 70° C. and the chlorine feed started. The chlorine feed rate for the first hour was 8 oz./hr.; for the second hour, 12 oz./hr.; and for the next hour and one-half 14 oz./hr. The chlorine feed rate was then progressively decreased over a period of four hours at which time 4.70 lbs. of chlorine had been fed to the reactor. The temperature was increased during the first hour to 100° C. and held at 100° C. for the remainder of the reaction. The reaction was terminated after 4.70 lbs. of chlorine had been fed. Although more than 4.7 moles of chlorine had been fed per mole of phenol the final product which weighed 1200 grams contained only 54.36% combined chlorine, which composition corresponds to approximately trichlorophenol. After four hours it was noted that the reaction mass was no longer exothermic and that most of the chlorine was passing through the primary reactor on into the HCl absorption system. The HCl and unreacted chlorine were absorbed in water in absorption tower 22.

*Example IV*

Example III was repeated with the exception that the temperature was increased to 130° C. for the remainder of the reaction. The product obtained again had a combined chlorine content corresponding to trichlorophenol.

*Example V*

The following is an example of the simultaneous preparation of technical grade pentachlorophenol and monochlorophenol utilizing minimum reaction temperature, minimum catalyst concentration and a minimum area factor.

In the equipment as shown in Fig. 1, 600 grams of specially dried (C.P. Baker's) phenol (crystallization temperature 41.0° C.) were charged to the primary reactor 15 and 600 grams to scrubber reactor 18. 3.7 grams of anhydrous aluminum chloride (0.00445 mole per mole of phenol) were added to the phenol in the primary reactor. No catalyst was used in the scrubber reactor. The temperature in the scrubber reactor was increased to 45° C. and held at 45° C. throughout the chlorination. The temperature in primary reactor was adjusted to 45° C. and held at 45° C. until one atom of chlorine had combined per mole of phenol. The temperature was then increased to 65° C. and held at 65° C. until the freezing point of the product reached 64° C. The reaction temperature was then increased continuously but held to within no more than 3° C. above the product freezing point. The area factor which resulted from this procedure was 6 degree-hours. Chlorine was fed continuously at the rate of from 10 to 12 ounces per hour. At the end of 8¾ hours 5.8 moles of chlorine per mole of phenol had been added and the primary reactor product had a freezing point of 177° C. The reaction was terminated at this time.

The primary reactor product had the following analysis:

| | | |
|---|---|---|
| Chlorinated phenols | percent | 98.0 |
| Alkali-insoluble matter | do | 0.02 |
| Freezing point | ° C | 177.0 |
| Pentachlorophenol | percent | 92.6 |
| Tetrachlorophenol | do | 5.4 |
| Polymers | do | 0.0 |

The scrubber reactor product contained 29% combined chlorine and comprised primarily 2-chlorophenol and 4-chlorophenol. The gases from scrubber reactor 18 were passed through a liquid separator and then absorbed in a counter-current water absorption system to make 36% hydrochloric acid solution. The resulting hydrochloric acid solution contained less than 0.1% free chlorine.

*Example VI*

The following is an example of the simultaneous preparation of technical grade pentachlorophenol and monochlorophenol utilizing maximum reaction temperature, minimum catalyst concentration and minimum area factor.

In the equipment as shown in Fig. 1, 600 grams of specially dried (C.P. Baker's) phenol (crystallization temperature 41.0° C.) were charged to the primary reactor 15 and 600 grams to the scrubber reactor 18. 3.6 grams of anhydrous aluminum chloride (0.004 mole per mole of phenol) were added to the phenol in the primary reactor. No catalyst was used in the scrubber reactor. The temperature in the scrubber reactor was increased to 130° C. and held at 130° C. throughout the chlorination. The temperature in the primary reactor was increased to 130° C. and held at 130° C. until the freezing point of the product reached 129° C. The reaction temperature was then increased continuously but held to within no more than 3° C. above the product freezing point. The area factor which resulted from this procedure was 4 degree-hours. Chlorine was fed continuously at the rate of from 10 to 12 ounces per hour. At the end of eight hours 5.7 moles of chlorine per mole of phenol had been added and the primary reactor product had a freezing point of 175° C. The reaction was terminated at this time. The primary reactor product had the following analysis:

| | | |
|---|---|---|
| Chlorinated phenols | percent | 96.8 |
| Alkali-insoluble matter | do | 0.1 |
| Freezing point | ° C | 175.0 |
| Pentachlorophenol | percent | 90.4 |
| Tetrachlorophenol | do | 5.8 |
| Polymers | do | 0.7 |

The scrubber reactor product contained 28% combined chlorine and comprised 2-chlorophenol and 4-chlorophenol. The gases from the scrubber reactor 18 were passed through a liquid separator. Because of the high scrubber temperature the gases had a high phenol content. The gases emerging from the liquid separator were then absorbed in a counter-current water absorption system to make 36% hydrochloric acid solution containing less than 0.2% free chlorine.

*Example VII*

The following is an example of the simultaneous preparation of technical grade pentachlorophenol and monochlorophenol utilizing maximum reaction temperature, maximum catalyst concentration and a minimum area factor.

The equipment, phenol load and procedure was the same as Example VI. Anhydrous aluminum chloride in the amount of 7.2 grams (0.0085 mole per mole of phenol) were added to the phenol in the primary reactor. The area factor which resulted was 5 degree-hours. The primary reactor product had the following analysis:

| | | |
|---|---|---|
| Chlorinated phenols | percent | 96.2 |
| Alkali insoluble matter | do | 0.96 |
| Freezing point | ° C | 177.5 |
| Pentachlorophenol content | percent | 89.5 |
| Tetrachlorophenol content | do | 1.7 |
| Polymers | do | 5.0 |

The scrubber reactor chlorinated phenol product contained 28% combined chlorine.

*Example VIII*

The following is an example of the simultaneous preparation of technical grade pentachlorophenol and monochlorophenol utilizing minimum reaction temperature, minimum catalyst concentration and maximum area factor.

Example V was repeated with the exception that when the freezing point of the product in the primary reactor reached 64° C. the reaction temperature was increased substantially above the freezing point of the product and held sufficiently above the freezing point of the product to give an area factor of 60 degree-hours. The reaction was terminated after 5.8 moles of chlorine per mole of phenol had been added. The primary reactor product had the following analysis:

| | | |
|---|---|---|
| Chlorinated phenols | percent | 95.7 |
| Alkali-insoluble matter | do | 0.1 |
| Freezing point | ° C | 175.0 |
| Pentachlorophenol | percent | 85.1 |
| Tetrachlorophenol | do | 3.4 |
| Polymers | do | 7.0 |

The scrubber reactor product contained 28% combined chlorine.

*Example IX*

The following is an example of the simultaneous preparation of technical grade pentachlorophenol and monochlorophenol utilizing maximum reaction temperature, maximum catalyst concentration and maximum area factor.

Example VII was repeated with the exception when the freezing point of the product in the primary reactor reached 130° C. the reaction temperature was increased substantially above the freezing point of the product to give an area factor of 50 degree-hours. The resulting primary reactor product had the following analysis:

| | | |
|---|---|---|
| Chlorinated phenols | percent | 95.2 |
| Alkali insoluble matter | do | 0.98 |
| Freezing point | ° C | 175.0 |
| Pentachlorophenol | percent | 85.0 |
| Tetrachlorophenol | do | 3.0 |
| Polymers | do | 7.03 |

The scrubber reactor product contained 27% combined chlorine.

*Example X*

The following is an example of the preparation of technical grade pentachlorophenol from partially chlorinated phenols.

In the equipment as shown in Fig. 1, 816 grams of the scrubber reactor product obtained from Example VII were placed in the primary reactor. 600 grams of commercial synthetic phenol were placed in the scrubber reactor. 6 grams of anhydrous aluminum chloride were added to the partially chlorinated phenols in the primary reactor. The temperature in the scrubber reactor was increased to 65° C. and held at 65° C. throughout the chlorination. The temperature in the primary reactor was increased to 100° C. and held at 100° C. until the freezing point of the product was 95° C. The reaction temperature was then held sufficiently above the freezing point of the product to produce an area factor of 11.9 degree-hours. Chlorine was fed continuously at a rate of from 10 to 14 oz. per hour until 4.7 moles of chlorine per mole of partially chlorinated phenol in the primary reactor had been added, at which time the primary reactor product had a freezing point of 177° C. and the reaction was terminated.

The product from the primary reactor had the following analysis:

| | |
|---|---|
| Chlorinated phenols _____percent__ | 96.9 |
| Alkali insoluble matter _____do____ | 0.6 |
| Freezing point _____° C__ | 177.0 |
| Pentachlorophenol _____percent__ | 88.2 |
| Tetrachlorophenol _____do____ | 3.2 |
| Polymers _____do____ | 5.8 |

The product from the scrubber reactor had a combined chlorine content of 28% and was ready to be transferred to the primary reactor for the preparation of an additional batch of technical grade pentachlorophenol.

*Example XI*

The following is an example of the preparation of technical grade pentachlorophenol from partially chlorinated phenols with the simultaneous production of 2,4-dichlorophenol.

In the equipment as shown in Fig. 1, 816 grams of the scrubber reactor product obtained from Example X were placed in the primary reactor. 600 grams of commercial synthetic phenol were placed in the scrubber reactor. 6 grams of anhydrous aluminum chloride were added to the partially chlorinated phenols in the primary reactor. Also, 6 grams of anhydrous aluminum chloride were added to the phenol in the scrubber reactor. The temperature in the scrubber reactor was increased to 70° C. and held at 70° C. throughout the chlorination. The temperature in the primary reactor was increased to 100° C. and held at 100° C. until the freezing point of the product was 95° C. The reaction temperature was then held sufficiently above the freezing point of the product to produce an area factor of 14 degree-hours. Chlorine was fed continuously at a rate of from 14 to 16 ounces per hour until 5.7 moles of chlorine per mole of partially chlorinated phenol in the primary reactor had been added at which time the primary reactor had a freezing point of 176° C. and the reaction was terminated. The product from the primary reactor had the following analysis:

| | |
|---|---|
| Chlorinated phenols _____percent__ | 97.0 |
| Alkali insoluble matter _____do____ | .6 |
| Freezing point _____° C__ | 176.0 |
| Pentachlorophenol content _____percent__ | 88.0 |
| Tetrachlorophenol content _____do____ | 3.0 |
| Polymers _____do____ | 5.9 |

The product from the scrubber reactor had a combined chlorine content of 43.4%. This product comprised primarily 2,4-dichlorophenol with lesser amounts of monochlorophenol and trichlorophenol present.

We have found that the 2,4-dichlorophenol can be separated from the scrubber product of Example XI by distillation or other means, leaving the monochlorophenol and trichlorophenol each as separate fractions or as a mixture having an average chlorine content of about 40%. If the separation leaves the monochlorophenol and trichlorophenol as separate fractions the monochlorophenol may be accumulated until there is a sufficient quantity to provide a load for the primary reactor 15 or the scrubber reactor 18. The monochlorophenol may also be admixed with phenol in any ratio to provide a load for either reactor.

If the monochlorophenol or admixture with phenol is used as the load for the scrubber reactor 18 proper adjustment of the chlorination conditions may be made to produce a product again rich in 2,4-dichlorophenol. Separation of the 2,4-dichlorophenol leaves the monochlorophenol and trichlorophenol and the process can then be repeated.

If the monochlorophenol or admixture with phenol is used as the load for the primary reactor 15 chlorination to pentachlorophenol may be carried out by the process herein disclosed.

The trichlorophenol fraction or the monochlorophenol-trichlorophenol mixture or an admixture of the trichlorophenol fraction with phenol or an admixture of the combination monochlorophenol-trichlorophenol fraction with phenol may be used as a load for the primary reactor 15 for further chlorination to pentachlorophenol by the process herein disclosed.

When using trichlorophenol containing mixtures as the load for primary reactor 15 we prefer to withhold the addition of the aluminum chloride catalyst until the rate of the chlorination reaction has slowed appreciably. The time for catalyst addition may be determined by the fall off of the exothermic heat of reaction from the primary reactor. We have found this effect to be very pronounced and useful as a control measure. We believe that this slowing of the reaction rate represents a point in the chlorination where substantially all of the phenol has been chlorinated to dichlorophenol. The addition of the catalyst at this time increases the rate of reaction and allows the further chlorination of trichlorophenol to tetra and pentachlorophenol to proceed.

The foregoing examples illustrate the variation in product analysis with reaction temperature, catalyst concentration and area factor. We have caused to be analyzed over 300 batches of technical grade pentachlorophenol made within the ranges of reaction temperature, catalyst concentration and area factors illustrated. The information we have gained is shown in Figures 4 and 5. In Figure 4, the range of area factor which will produce a technical grade pentachlorophenol containing a minimum of 95% chlorinated phenols, is shown. Figure 5 presents our findings in regard to the variation in pentachlorophenol content and alkali insoluble matter for various area factors and catalyst concentration-reaction temperature combinations.

We claim:

1. A process for the production of technical grade pentachlorophenol containing less than 1% of matter insoluble in 1 N sodium hydroxide solution, and having a melting point of at least 174° C., which process comprises first chlorinating phenol at an elevated temperature to produce an intermediate chlorinated product having a melting point not exceeding 120° C., the temperature in the first stage being sufficient to maintain the reaction mass in a molten state but below 130° C., then chlorinating the intermediate product at an elevated temperature sufficient to maintain the reaction mass liquid, the differential between the reaction mass temperature and its melting point being controlled so that the mathematical product of said temperature differential expressed in degrees centigrade and the hours of time required in the further chlorination to reach a chlorophenol product freezing point of 174° C. does not exceed about 60, the chlorination being carried out in the presence of between 0.004 and 0.0085 mole of anhydrous aluminum chloride catalyst per mole of phenol at least from the time where two atoms of chlorine have been combined with one mole of phenol.

2. A process as set forth in claim 1 using a substantially stoichiometric quantity of chlorine involving a two-step counter-current chlorination of phenol wherein dilute chlorine off-gas from a final chlorination step 2 in which pentachlorophenol is produced from a partially chlorinated phenol, is used as the chlorinating agent of the initial partial chlorination of phenol in the first step.

3. A process for the production of technical grade pentachlorophenol containing less than 1% of matter insoluble in 1 N sodium hydroxide solution, and having a melting point of at least 174° C., which process comprises first chlorinating phenol at an elevated temperature to produce an intermediate chlorinated product having a melting point not exceeding 120° C., the temperature in the first stage being sufficient to maintain the reaction mass in a molten state but below 130° C., then chlorinating the intermediate product at a temperature of about 10° C. above the melting point of chlorophenols undergoing treatment in the presence of between 0.004 and 0.0085 mole of anhydrous aluminum chloride catalyst per mole of phenol at least from the time where two atoms of chlorine have been combined with one mole of phenol, the total chlorination time being from 5 to 15 hours.

4. A process as set forth in claim 3 using a substantially stoichiometric quantity of chlorine and involving a two-step counter-current chlorination of phenol wherein dilute chlorine off-gas from a final chlorination step 2 in which pentachlorophenol is produced from a partially chlorinated phenol, is used as the chlorinating agent of the initial partial chlorination of phenol in the first step.

References Cited in the file of this patent
UNITED STATES PATENTS

| | | |
|---|---|---|
| 2,131,259 | Stoesser | Sept. 27, 1938 |
| 2,429,985 | Blume et al. | Nov. 4, 1947 |
| 2,440,602 | Foster et al. | Apr. 27, 1948 |
| 2,485,562 | Cavelti | Oct. 25, 1949 |